United States Patent
Hellé et al.

[11] Patent Number: 5,183,598
[45] Date of Patent: Feb. 2, 1993

[54] PROCESS OF AND APPARATUS FOR MAKING THREE-DIMENSIONAL OBJECTS

[75] Inventors: Jean-Louis Hellé, Gouvieux; Jean-Claude André; Philippe Schaeffer, both of Nancy, all of France

[73] Assignee: Dassault Aviation, Paris, France

[21] Appl. No.: 664,626

[22] Filed: Mar. 4, 1991

[30] Foreign Application Priority Data

Mar. 20, 1990 [FR] France ............................... 90 03521

[51] Int. Cl.[5] ....................... B29C 35/08; B29C 67/12
[52] U.S. Cl. ..................................... 264/22; 156/155;
156/242; 156/264; 156/267; 156/272.8;
156/292; 156/379.6; 156/501; 156/512;
219/121.65; 219/121.66; 219/121.67;
219/121.72; 219/121.73; 219/121.85;
250/492.1; 264/25; 264/152; 264/163; 264/255;
264/257; 264/308; 264/317; 425/174.4;
425/295; 425/297; 425/305.1; 425/308;
425/310; 425/446
[58] Field of Search ................. 264/22, 25, 40.1, 152,
264/163, 255, 257, 308, 317; 425/135, 174,
174.4, 295, 297, 305.1, 308, 310, 375, 446;
156/64, 155, 242, 264, 267, 272.2, 272.8, 292,
378, 379.6, 501, 512; 219/121.65, 121.66,
121.67, 121.72, 121.73, 121.85; 250/492.1

[56] References Cited

U.S. PATENT DOCUMENTS

| | | | |
|---|---|---|---|
| 4,217,168 | 8/1980 | Ridgway et al. | 156/264 X |
| 4,247,508 | 1/1981 | Housholder | 264/219 |
| 4,752,352 | 6/1988 | Feygin | 156/264 X |

FOREIGN PATENT DOCUMENTS

| | | |
|---|---|---|
| 0250121 | 12/1987 | European Pat. Off. . |
| 0322257 | 6/1989 | European Pat. Off. . |
| 2567668 | 1/1986 | France . |
| 2583333 | 12/1986 | France . |
| 2639948 | 6/1990 | France . |

OTHER PUBLICATIONS

Science et Technologie, No. 2, Feb. 1988, "CFAO: de l'écran au prototype en moins d'une heure" w/translation.

Industrial Laser Review, vol. 2, No. 8, Jan. 1988, "Instant Models Through Stereolithography", pp. 11 and 13.

English-Language Abstract of Japanese Reference (Kokai) 63-141,725 (published Jun. 14, 1988).

*Primary Examiner*—Leo B. Tentoni
*Attorney, Agent, or Firm*—Stevens, Davis, Miller & Mosher

[57] ABSTRACT

Process for obtaining three-dimensional objects, according to which process a sheet (2A, 2B, 2C) is prepared, which sheet is composed of a material, the solubility of which varies when it is subjected to a specific radiation, and of fibers or of a screen for reinforcement, the sheet having a sufficient rigidity to be handled and being capable of adhering on a similar sheet. The sheet is subjected to said radiation (18) in a defined zone, and then a new sheet is fixed onto it and the passing of radiation is recommenced, and then the stack is subjected to a selective dissolving which causes the desired object (31) to appear.

14 Claims, 3 Drawing Sheets

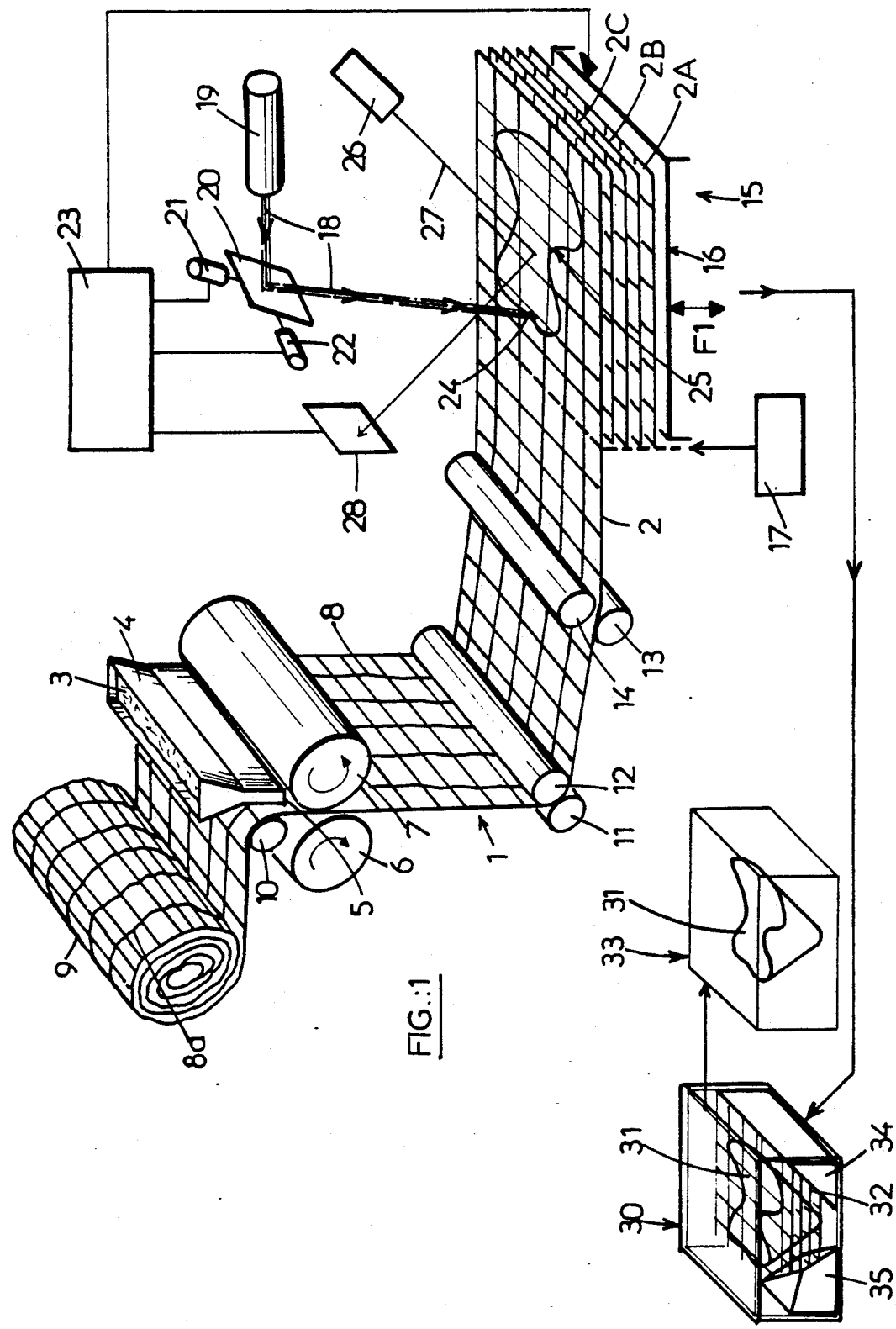
FIG.:1

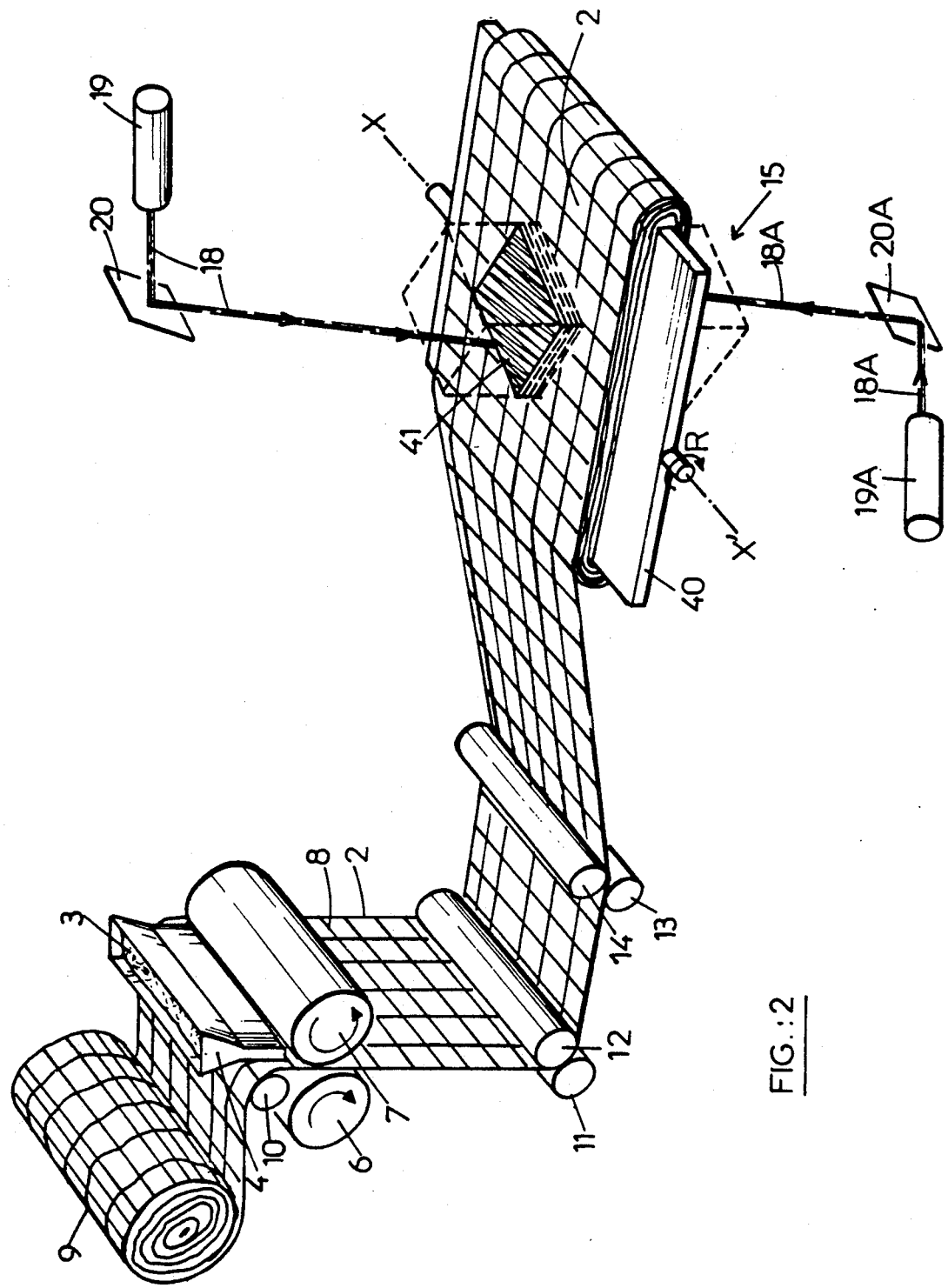
FIG.:2

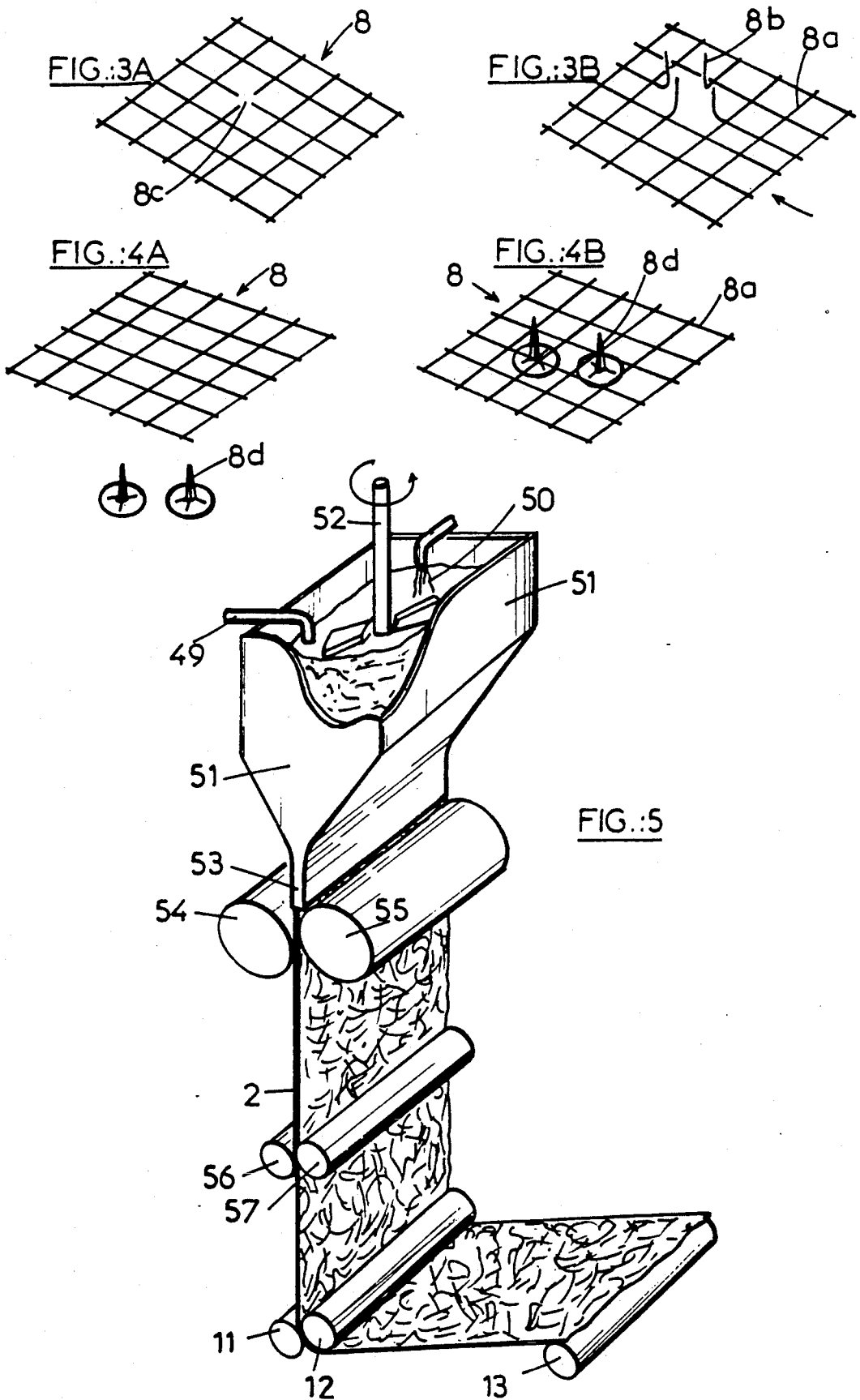

PROCESS OF AND APPARATUS FOR MAKING THREE-DIMENSIONAL OBJECTS

BACKGROUND OF THE INVENTION

1. Field of the Invention

The present invention relates to a process and a device for the production of objects or models of industrial parts, by action of light and especially by phototransformation of a plastic or composite material.

2. Description of the Related Art

It is desirable to be able to have available a few models of an industrial part such as, especially, a mechanical part, before initiating the mass production thereof. At the present time, in order to construct models of such parts, it is necessary in the first instance to arrange for the production of dimensioned drawings in the design office on the basis of numerical data which define the shape of the part. For the past few years, the method of "computer-aided design" (CAD) has been employed for the purpose of defining the shape of this part.

It is known to provide for a process and for a device for the production of models of industrial parts making use of the numerical data available in the output memories of the computer, directly for the purpose of constructing the models of parts without being obliged to proceed via drawings or to have to involve numerical-control finishing machines such as milling machines, lathes, etc.

Processes and devices proposed for the construction of models by means of CAD are based on a LASER-induced chemical polymerisation. The slaved displacement of one or more laser beams concentrated at a single point permits the local polymerization of a polyfunctional monomer and, step by step, the construction of the part.

In particular, the document FR-A-2,567,668 describes a process, of which the general principle of construction of a part is based on the use of an apparatus comprising a cell which contains the liquid photopolymerizable monomer at the location of which there is aligned a movable platform which descends step by step in the course of the operation. The UV laser beam traces at the surface of the liquid successive sections of the object to be produced, by virtue of a set of mirrors with electronic deflection, which set is driven by the database of the CAD system. The software has previously subdivided the virtual model of the object into a multitude of slices of small thickness. Progressively as the solidification of each slice proceeds, the "carved" model is slowly immersed in the cell: using a 10 mW laser, this system permits the creation of a part having a height of 30 mm in 50 minutes, with an accuracy of the order of 1/10 mm. The model may be created in all types of materials (plastics), in a wide variety of colors, with differing hardnesses and a whole range of resistances to abrasion (SCIENCE ET TECHNOLOGIE No. 2, February 1988/INDUSTRIAL LASER REVIEW, Vol. 2, No. 8, January 1988, pages 11 and 13). This type of process for the manufacture of three-dimensional models, which makes use of the principle of the single-photon absorption of light by polymerization or cross-linking photoinitiators, exhibits the disadvantage of requiring the superposition of the monomer (or of an oligomer or of a mixture) on parts which have already been polymerized; in order to obtain a good accuracy of the model, it is necessary to superpose a considerable number of liquid or pasty layers of monomer; this may lead to fairly long construction times. Furthermore, the material obtained after irradiation has, in general, a greater density than the initial material; this may lead to difficulties in carrying out the process and to instabilities, deformations or stresses on the whole or part of the model.

The document EP-A-O,250,121 describes a process corresponding to the same general principle.

French patent application No. 2,639,948, filed by the National Centre for Scientific Research and not published after the date of priority of the present application, proposes a process permitting the production of models of industrial parts by action of light, giving improved compliance with the practical requirements as compared with the processes and devices aiming at the same object proposed in the prior art.

In this process, a part is constructed by the superposition of a plurality of layers of a solid or plastic material which is made either soluble in the presence of light or insoluble in the presence of a light of appropriate wavelength.

After successive irradiation of each layer, at appropriate locations, it is sufficient to place in a bath of appropriate solvent the stack of layers, which are linked to one another at the appropriate sites.

This method exhibits the following advantages:

"dry" and odorless manufacture of a part;

creation of a three-dimensional latent image permitting in principle the use of a CAD which is simplified as compared with that which is required for photochemical polymerizations of liquids, involving the need to anchor the parts on the support.

However, the method exhibits limitations:

The first corresponds to the existence of a shrinkage associated with the formation of chemical bonds, occupying a smaller space between the insoluble cross-linked polymers.

The second is the difficulty of removing the non-irradiated polymer (if it is this which is soluble) from the irradiated polymer without loss of accuracy of the patterns. The concept of solubility/insolubility is theoretical; actually, only relative differences of solubility are involved. For parts in which the non-irradiated polymer is easily accessible to the solvent, which is itself liable to be well stirred, permitting a promoted dissolving, the insoluble irradiated polymer is virtually not attacked at all.

On the other hand, for hollow parts, in which the dissolving cannot be promoted by the stirring, the time of contact of the solvent may be so long that a part of the irradiated polymer may be dissolved. It is, of course, the same if it is the non-irradiated polymer which is "insoluble".

These two limitations permit the production of patterns corresponding precisely to what is specified only when these patterns comply with certain conditions, and it is difficult and costly to modify the programs in order to take account in advance of the influence of the shrinkages or of the non-homogeneous dissolvings.

Materials are known which have a very low shrinkage, and even materials which exhibit a swelling under irradiation, so that, by mixing, it is possible to obtain a zero shrinkage. However, the use of such mixtures results in the replacement of the limitations inherent in a shrinkage by limitations relating to the selection of the materials.

SUMMARY OF THE INVENTION

The object of the present invention is to provide a process of the type which has just been described, and which avoids these limitations, permitting the production of objects having a greater faithfulness of patterns.

In order to obtain this result, the invention provides a process for the production of objects of defined shape comprising the following steps:

a) providing a thin layer of a high-viscosity or solid material which, when it is subjected to a defined radiation, undergoes a change of solubility in at least one specified solvent, accompanied by a change of volume less than a predetermined limit, b) scanning said first thin layer with a beam of said radiation, according to a trace specified in advance and under conditions of intensity and of duration which are capable of causing said change, c) providing a second thin layer of one and the same material and superposing it on the first, d) scanning said second thin layer with a beam of the same radiation, according to a trace such that and under conditions such that said change of solubility occurs in the second layer and that that volume of the second layer which is affected by said change is capable of forming at least one volume continuous with that volume of the first layer which has been previously affected by said change of solubility, e) causing the adhesion of said second layer on the first layer, at least in the region of these two layers which, after the irradiation, have the lowest solubility, in such a manner as to constitute a continuous volume of material having lower solubility, f) repeating the operations c) to e) until the volumes of material having lower solubility of the successive layers constitute together an integral unitary volume having the shape of the desired object, g) placing the stack formed by the superposed successive layers in contact with said solvent in such a manner as to separate the parts of material having lower solubility from the parts of material having higher solubility, it being possible for the step e) to take place before the step d) or after the step f), this process exhibiting the particular feature that at least one of said thin layers is previously reinforced with fibers or with a screen.

The fibers may be disposed without order, forming a sheet similar to a non-woven product.

The screen may be formed of fibers disposed in a coordinated manner to form the threads of a grid or of a fabric. It is also possible to contemplate a screen obtained in a different manner, for example from a metal sheet perforated by mechanical or chemical means, or in accordance with the "expanded metal" technique.

The fibers, or the screen, are preferably incorporated in the thin layer while the material is in a pasty condition. A step of treatment intended to increase the viscosity of the material after the incorporation of the fibers or of the screen may be carried out before the placing in position of the thin layer at the station where it is to receive the radiation.

The presence of fibers or of a screen, constituting a reinforcement, effectively opposes the shrinkage and any deformation associated with the shrinkage. Moreover, by imparting a greater rigidity to the stack, it permits the designing of shapes which are more favorable to the obtaining of a regular dissolving, by virtue of improved possibilities for circulation and for stirring of the solvent.

In order to achieve a further increase in the solidity of the stack, it is possible to provide, if a screen is used, that the latter exhibits projections perpendicular to its plane, projecting outside said thin layer, and designed to cooperate with the screen of an adjacent layer, constituting a three-dimensional reinforcement.

According to another procedure, which also tends to increase the solidity of the stack, it is possible to provide that there are incorporated in said thin layer additional rigid parts which form projections beyond the surface of the layer and are designed to cooperate with the fibers or the screen of said thin layer and with the fibers or the screen of an adjacent thin layer in order to construct, together with these screens, a three-dimensional reinforcement.

Preferably, in order to increase the rigidity of each thin layer, said material capable of a change of solubility contains an inert filler.

Advantageously, said material capable of a change of solubility undergoes a volume variation of less than 2% when it receives said radiation. This permits a reduction of the stresses which the fibers or the screen must withstand, and thus a reduction of the proportion of fibers or the size of the screen.

At the end of the step g), fibers, or the screen, if they have not been dissolved, project outside the nondissolved volume. This is the case, especially, when a metal screen is used. In the case where the fibers, or the screen, which thus project prove to be troublesome, they are removed by dissolving or chemical attack, by means of a substance which does not act on the nondissolved volume. For example, a metal screen may be removed by action of an acid. It has been found that very good surface conditions were obtained in this manner.

In spite of the precautions set forth hereinabove, deformations due to shrinkages may appear when the area of the cross section scanned by the radiation exhibits large variations from one layer to another of the object to be constructed. In fact, a layer which has undergone a large global irradiation tends to exhibit an overall shrinkage greater than a layer which has been given a slight irradiation. In order to avoid this disadvantage, it is possible to provide in this case compensation zones such that the total scanned surface area shows no more than slight variation from one layer to the other.

If the object which it is desired to produce includes cavities which are closed or which communicate with the exterior via confined passages, said integral unitary volume is formed with broadened or supplementary passages for the communication of said cavities with the exterior, in order to permit a less restricted circulation of the solvent, these passages possibly being filled subsequently. This manner of operating is greatly facilitated by the high rigidity of the integral volume obtained according to the invention.

An apparatus for carrying out a process according to the invention may comprise:

means for forming a continuous strip of said material, reinforced by the screen, means for directing said strip towards a treatment station, means for cutting the strip into unitary sheets and for superposing each sheet on a previously treated sheet, in adhesion contact, treatment means comprising a radiation source capable of passing said radiation to a defined point of the sheet, means for detecting the position of the sheet and means for displacing said impact point in accordance with a defined law as a function of said position of the sheet, means for directing the block formed by a superposition of treated sheets to an installation for dissolving the non-polymerized material and possibly the remaining fraction of the screen.

According to a further embodiment, the apparatus for carrying out a process according to the invention comprises:

means for forming a continuous strip of said material, reinforced by the screen, means for directing said strip towards a treatment station, a rotatable support on which said strip may be wound, treatment means comprising a radiation source capable of passing said radiation to a defined point of the wound strip, means for detecting the position of the impact point of the radiation on the wound strip and means for displacing said impact point in accordance with a defined law as a function of the location of said wound strip, and means for separating from the rotatable support the block formed by the wound sheets and for directing it to an installation for dissolving the low-solubility part of the material.

The description which will follow with reference to the accompanying drawings will explain in greater detail how the invention may be implemented.

BRIEF DESCRIPTION OF THE DRAWINGS

FIG. 1 is a diagrammatic view showing an apparatus for carrying out a process for the production of a three-dimensional object according to the invention.

FIG. 2 is a diagrammatic view of an apparatus according to a further embodiment.

FIGS. 3A and 3B show respectively views of a metal armoring incorporated in the material before and after creation of a relief.

FIGS. 4A and 4B show respectively views of a metal armoring incorporated in the material before and after creation of a relief according to a modified embodiment.

FIG. 5 is a diagrammatic view showing an apparatus for carrying out a variant of a process for the production of a three-dimensional object according to the invention, more particularly showing the production of the material.

DETAILED DESCRIPTION OF THE INVENTION

According to a first embodiment of the invention, which is diagrammatically represented in FIG. 1, the apparatus which is designated overall by the reference 1 comprises means for forming a continuous strip 2 from a fluid composite material 3 composed of a filler, a polyfunctional monomer of the acrylic or epoxy family, and at least one photochemical or thermal initiator.

This high-viscosity material is introduced into a container 4 in the form of a longitudinal hopper, a feed slit 5 of which conducts the material in proximity to two thickness-control rollers 5 and 7 which are driven in rotation by the unwinding of the strip 2 in senses convergent in a direction of flow of the material between said rollers, between which a metal screen 8 is simultaneously driven in order to be incorporated in the material 3.

The metal screen 8 is present in the form of a coil 9, the end of which is initially introduced between the rollers 6 and 7 by a guide roller 10 constituting a first sense-deflecting roller, transforming a horizontal unwinding of the screen into a vertical unwinding in such a manner as to promote the flow of the material 3 in a natural sense.

After formation of the strip 2, the latter is again deflected in order to ensure its horizontal unwinding, by means of two deflecting rollers 11, 12. These directing means 10, 11, 12 are supplemented by two drive rollers 13 and 14 conducting the strip 2 towards a treatment station 15.

The latter comprises a support 16, which is movable vertically and is intended to carry a stack of superposed unitary sheets 2A, 2B, 2C, the upper stage of this stack being constituted by the end of the sheet 2. A cutting device 17, for example a laser cutting device, cuts off a unitary sheet from the end of the sheet when the latter has been treated, and a lowering of the support permits the arrival of the new end part of the sheet 2 above the unitary sheet which has just been treated. Pressing means, not shown, ensure the adhesion of the sheets of the stack on one another.

The treatment of the upper sheet is undertaken by polymerization induced by a laser beam 18 emitted by a generator 19 which may be of one of the following types:

Continuous-wave UV lasers: helium/cadmium lasers or ionized argon lasers, in particular.

Pulsed UV lasers: nitrogen lasers, eximer lasers or three-fold or four-fold YAG lasers, in particular.

Continuous-wave or pulsed visible lasers, on condition that the formulation of the phototransformable film comprises photosensitizer products which absorb within the visible range.

Continuous-wave or pulsed infrared lasers associated with thermal initiators.

The laser beam 18 emitted by the generator 19 is directed, via at least one orientable mirror 20, towards the surface to be treated in accordance with the image 21 to be obtained.

The mirror 20 is equipped with two orientation motors 21, 22, which are connected to a control component 23 in such a manner as to displace the impact point 24 of the laser beam 18 on the layer in the course of treatment.

The control component 23 causes the impact point 24 to follow a defined path 25 in accordance with the program which it has received. This path is a function of the position of the layer to be treated above the support 16. The position of the latter is a function of the number of unitary sheets 2A, 2B, 2C which are stacked on it, in such a manner that the upper sheet, which is to be treated, is always almost at the same height. Nevertheless, as the thickness of the unitary sheets may exhibit variations, it is necessary to know with accuracy the position of the upper sheet.

This is obtained by virtue of a control device constituted by a fixed auxiliary light generator 26, the radiation of which has no effect on the material of the layer. The beam 27 emitted by the generator 26 is reflected on the surface of the layer and received by a sensor 28 comprising a receiving screen. The exact position of the point at which the light beam strikes the sensor 25 indicates the location of the upper surface of the stack, which is to be treated. The sensor 28 is connected to the control component 23, which also receives signals representative of the position of the support 16, the upper face of which, which carries the base of the stack, constitutes a reference surface. The control component 23 may thus compute with accuracy the position of the upper face of the stack in relation to the base, and consequently select the sub-program for the trace at the curve 25 which corresponds to this position or to the closest position.

The block constituted by a complete stack of unitary sheets 2A, 2B, 2C,... containing the latent image of the object to be obtained is removed from the treatment station 15 by means not shown, which may be manual, and transferred into a dissolving cell 30, which is filled with a solvent capable of dissolving the soluble fraction of the material of the sheets. This dissolving cell is shown in FIG. 1 on a reduced scale. A solid object 31 is extracted from the cell 30, which object has the desired shape, but the external surface of which carries the non-dissolved screen threads 32. The object 31 is then brought into an attack cell 33 in which the screen threads 32 are destroyed.

In the example described, the object 31 is of broadly conical shape, and compensation masses 34, 35 have been created, which are of very broadly complementary shape, intended to avoid a deformation under the effect of a shrinkage. In the dissolving vessel 30, these compensation masses may remain linked to the object 31 by the remaining screen 32, and may be separated therefrom in the attack vessel 33. It is also possible to cut summarily the screen threads 32 before the transfer into the vessel 33 in order to avoid the risk of damaging the object during this transfer.

The operations defined hereinabove thus lead to the construction of a solid three-dimensional object, the final dimensions of which correspond to the setpoint values originating from the computer-aided design (CAD) system.

As has been explained hereinabove, this process permits the construction of a latent image permitting the use of a simplified CAD.

In order to permit the three-dimensional strengthening of the part thus constructed by polymerization, it is possible to use a metal screen 8 in which vertical reliefs 8b have been constructed, by local cutting 8c of the latter and creation of a relief constituted by a metal wire (FIG. 3). Other systems of the same type may be constructed in order to permit an improved relation in the armoring between the layers, as, for example, in FIG. 4, where additional metal parts 8d pass through said screen 8.

In this example, the metal screen may advantageously be constituted by metals which can easily be attacked by products such as acids or bases; the metals concerned may be iron, zinc, aluminum or alloys.

The vertical resolution of the process is directly linked to the thickness of the metal screen.

According to another embodiment of the apparatus shown in FIG. 2, the apparatus differs essentially from the preceding one in that the movable means for changing the position of the unitary sheets are constituted by a flat support 40 which is rotatable about an axis XX', which is driven in rotation in a sense R by motor means not shown and permits the winding of the strip 2 between each treatment of unitary sheets. It is possible to construct two objects simultaneously by means of a doubling of the radiation sources 19, 19A which are capable of passing a laser beam 18, 18A via orientable mirrors 20, 20A respectively, towards the unitary sheets to be treated in accordance with predefined images 41.

In this embodiment, the rollers 13, 14 forming part of the directing means are no longer motors as in the preceding example, but only tension devices, since the motor driving is effected by the actual rotation of the support 40. This gives, without auxiliary means, a good application of the unitary sheets to one another.

It is, of course, possible to devise a support having three faces, having four faces etc... rather than two parallel ones, permitting the construction of more objects simultaneously. Of course, the radiation sources will be multiplied in the same manner.

Besides the benefit of such a device, for the construction of at least two objects simultaneously, such a device permits, by the pressure exerted on the rigid and stable metal screen 8, the maintenance of flatness by tensioning of the treated surface.

According to another embodiment (not shown) of a composite material according to the invention, the screen may be constituted by a fabric constructed by means of natural or artificial fibers which are capable of being dissolved or destroyed by chemical or thermal processes.

Finally, according to a last embodiment in accordance with the invention (FIG. 5), the paste permitting the construction of a strip is constructed from a nonwoven material constituted by metal wires or by natural or synthetic mineral or organic fibers impregnated with an oligomer and with its initiator. In this process, which requires short fibers, the simple dissolving of the soluble fraction permits the obtaining of the desired object, unless a fine surface condition is desired.

This embodiment differs essentially from the preceding ones by the fact that the fluid raw material 49, which is oligomer-based, and the fibers 50 are introduced simultaneously into a hopper 51 in which an agitator 52 is activated in rotation in order to obtain a homogeneous composite paste of the fibers 49. The material thus obtained escapes through a longitudinal die 53 constituting the lower part of said hopper, in proximity to two rollers 54, 55 for controlling the thickness of and for shaping the composite material. The latter, thus transformed into strip 2, passes between two intermediate drying rollers 56, 57, the function of which is to remove the excess fluid and to obtain the final thickness of the strip 2 to be treated. The strip 2 held in this manner is directed towards a treatment station 15 according to any one of the directing means which have been described hereinabove.

We claim:

1. A process for the production of objects of defined shape, comprising the following steps:
   a) providing at least one thin layer which, when it is subjected to a defined radiation, undergoes a change of solubility in at least one specified solvent, accompanied by a change of volume less than a predetermined limit,
   b) reinforcing at least one of said thin layers with fibers or with a screen,
   c) scanning said first thin layer with a beam of said radiation, according to a trace specified in advance and under conditions of intensity and of duration which are capable of causing said change of solubility, d) providing a second thin layer of the same material and superposing it on the first, e) scanning said second thin layer with a beam of the same radiation, according to a trace such that and under conditions such that said change of solubility occurs in the second layer and that the volume of the second layer which is affected by said change of solubility is capable of forming at least one volume continuous with that volume of the first layer which has been previously affected by said change of solubility, f) causing the adhesion of said second layer on the first layer, at least in the region of these two layers which, after their respective irradiation, have the lowest solubility, in such a manner as to constitute a continuous volume of material having lower solubility, g) repeating the operations d) to f) until the volumes of material having lower solubility of the successive layers constitute together an integral unitary volume having the shape of the desired object, h) placing the stack formed by the superposed successive layers in contact with said solvent in such a manner as to separate the parts of material having lower solubility from the parts of material having higher solubility, wherein step f) occurs before the step e) of after the step g).

2. The process of claim 1, wherein, in order to reinforce said thin layer, there are incorporated therein, while the material is in a pasty condition, short fibers forming a sheet of non-woven product.

3. The process of claim 1, wherein, in order to reinforce said thin layer, a screen is incorporated therein while the material is in a pasty condition.

4. The process of claim 3, comprising the use of a screen, wherein the screen exhibits projections perpendicular to its plane, projecting outside said thin layer, and designed to cooperate with the screen of an adjacent layer, constituting a three-dimensional reinforcement.

5. The process of claim 3, wherein there are incorporated in said thin layer additional rigid parts which form projections beyond the surface of the layer and are designed to cooperate with fibers or a screen incorporated into said thin layer and with fibers or a screen incorporated into an adjacent thin layer in order to construct a three-dimensional reinforcement.

6. The process of claim 1, wherein said material capable of a change of solubility contains an inert filler.

7. The process of claim 1 wherein said material undergoes a volume variation of less than 2% when it receives said radiation.

8. The process of claim 1 including removal of the fibers or the screen which, after the step g), project outside a non-dissolved volume, by dissolving or chemical attacking the fibers or the screen by means of a substance which does not act on said non-dissolved volume.

9. The process of claim 1 wherein in the case where, from one layer to another of the object to be constructed, an area of a cross section to be scanned by said radiation exhibits large variations, there are provided compensation zones such that the total scanned surface area shows no more than slight variation from one layer to the other.

10. The process of claim 1, wherein the object which it is desired to procure includes cavities which are closed or which communicate with the exterior via confined passages, said integral unitary volume is formed with broadened or supplementary passages for the communication of said cavities with the exterior, in order to permit a less restricted circulation of the solvent.

11. An apparatus for carrying out the process according to claim 1, comprising:

means for forming a continuous strip of said material, reinforced by a screen, means for directing said strip towards a treatment station, means for cutting the strip into unitary sheets and for superposing each sheet on a previously treated sheet, in adhesion contact, treatment means comprising a radiation source capable of passing said radiation to a defined point of the sheet, means for detecting a position of the sheet and means for displacing said point as a function of said position of the sheet, and means for directing a block formed by a superposition of treated sheets to an installation for dissolving the high-solubility part of the material.

12. An apparatus for carrying out the process according to claim 1 comprising:

means for forming a continuous strip of said material, reinforced by a screen, means for directing said strip towards a treatment station, a rotatable support on which said strip is to be wound, treatment means comprising a radiation source capable of passing said radiation to a defined point of the wound strip, means for detecting the position of an impact point of the radiation on the wound strip and means for displacing said impact point as a function of a location of said wound strip, and means for separating from the rotatable support a block formed by the wound strips and for directing the block to an installation for dissolving the low-solubility part of the material.

13. The apparatus of claim 11 wherein said installation dissolves not only the high solubility part of the material but also the remaining fraction of the screen.

14. The process of claim 10 including the additional step of subsequently filling the passages.

* * * * *